Oct. 27, 1964 H. B. ELLIS 3,153,917
APPARATUS FOR STORING AND SHIPPING PERISHABLE MATERIAL
Filed July 12, 1961 2 Sheets-Sheet 1

INVENTOR.
HERBERT B. ELLIS
BY PARKER & CARTER
ATTORNEYS

Oct. 27, 1964  H. B. ELLIS  3,153,917
APPARATUS FOR STORING AND SHIPPING PERISHABLE MATERIAL
Filed July 12, 1961  2 Sheets-Sheet 2
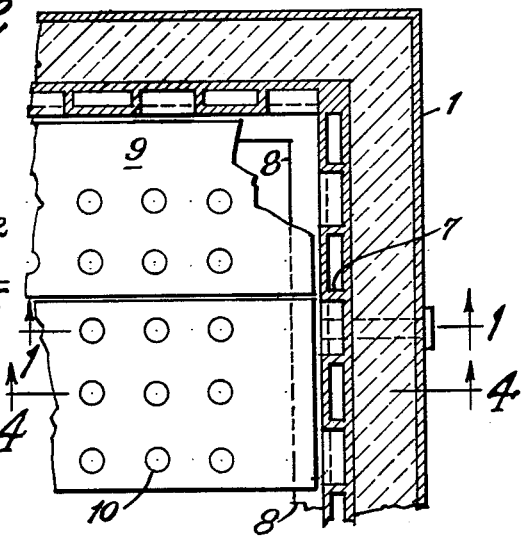
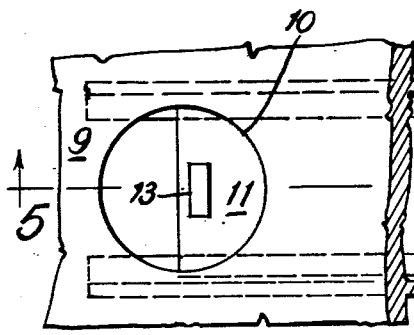
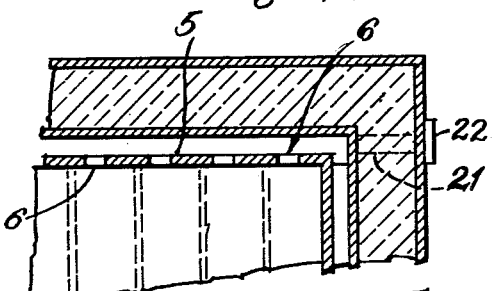
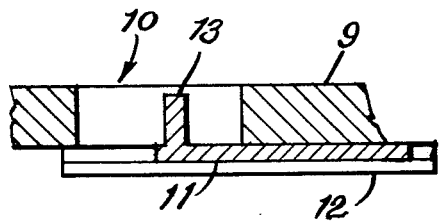
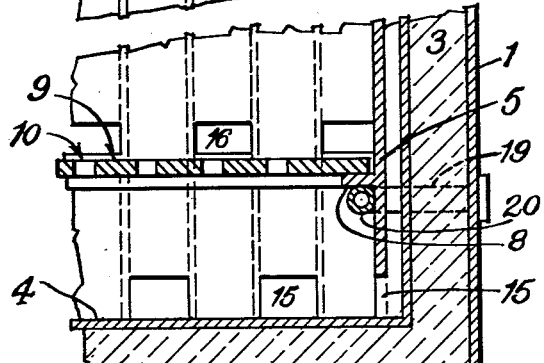
INVENTOR.
HERBERT B. ELLIS
BY PARKER&CARTER
ATTORNEYS

United States Patent Office 3,153,917
Patented Oct. 27, 1964

3,153,917
APPARATUS FOR STORING AND SHIPPING PERISHABLE MATERIAL
Herbert B. Ellis, Pasadena, Calif., assignor to Reliquefier Corporation, New York, N.Y., a corporation of New York
Filed July 12, 1961, Ser. No. 123,476
4 Claims. (Cl. 62—408)

My invention relates to improvements in apparatus for storing and shipping perishable material and has for one object to provide a storage or shipper container wherein frozen and fresh foodstuffs may be stored and shipped together and wherein the water of composition of the frozen foodstuffs, frozen at temperatures far below zero degrees F. provides the refrigeration to maintain the fresh food at the desired above freezing low temperature.

Another object of the invention is to insure such movement of cold gas or cold air within the container that the frozen food or the water of composition thereof may act effectively as a refrigerant to cool the fresh food.

Another object of the invention is to control the rate of heat exchange so that the fresh food will not be chilled below freezing and will remain at the desired point by heat exchange with the frozen food.

Other objects will appear from time to time throughout the specification and claims.

The invention is illustrated more or less diagrammatically in the accompanying drawings, wherein FIGURE 1 is a vertical section through a container embodying my invention;

FIGURE 2 is a detail section along the line 2—2 of FIGURE 1;

FIGURE 3 is a detail plan view;

FIGURE 4 is a section along the line 4—4 of FIGURE 2;

FIGURE 5 is a section along the line 5—5 of FIGURE 3.

Like parts are indicated by like numerals throughout the specification and drawings.

Figure 1:
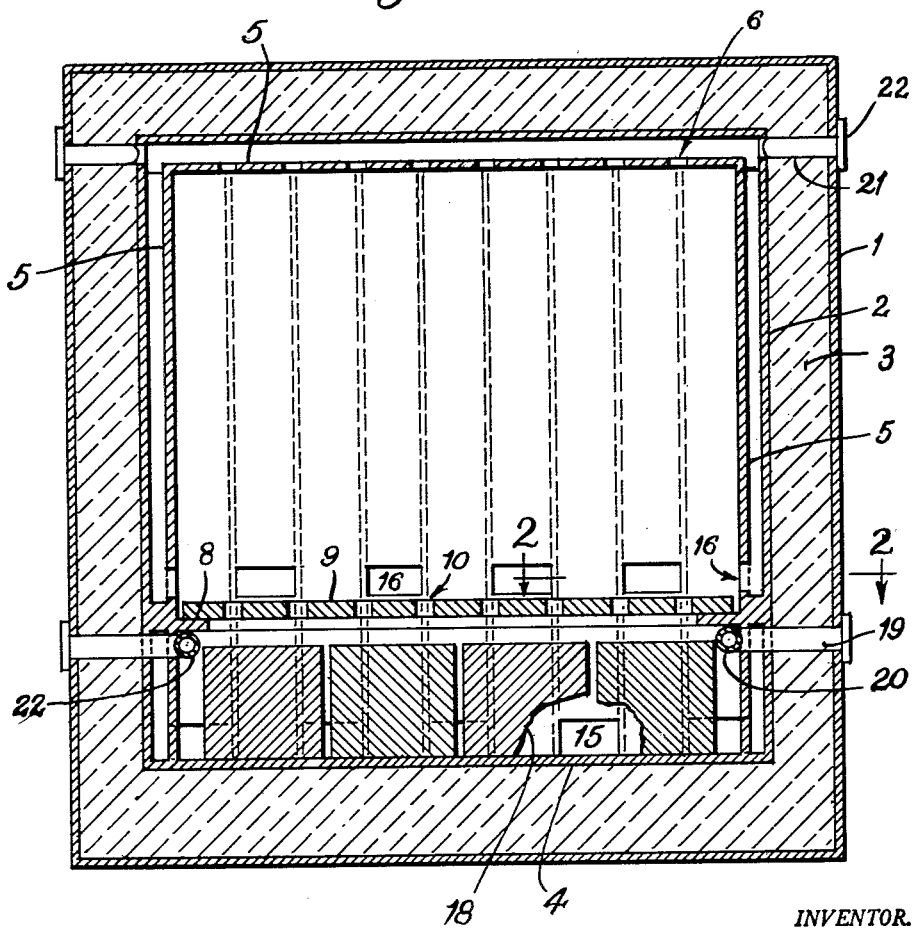

I have illustrated this invention with a shipper container box. It might equally well be a freight car, truck or trailer, airplane or a marine vessel. The principles involved are identical though the shape may differ.

The shipper container includes an outer shell 1, an inner lining 2, an insulation 3, between the top, bottom and sides of the outer shell and inner lining. Access doors will be provided but are not shown in the interest of clarity. Contained within the inner lining, extending upwardly from the floor 4 thereof toward, but terminating below, the top is a cage 5. The cage is perforate as at 6 at the top to communicate with a plenum chamber extending across the top of the cage and below the top of the lining. A plurality of vertically disposed partition walls 7 divide the vertical space between the cage 5 and the lining wall 2 into a multiplicity of parallel vertical flues bounded on one side by the heat conductive wall of the cage 5 and on the other side by the lining 2. Extending inwardly from the vertical walls of the cage 5 about its entire periphery spaced above the floor 4 are flanges 8 which support a plurality of removable floor planks 9, which planks divide the cage into an upper fresh food storage compartment and a lower frozen food storage compartment. The floor planks 9 are apertured as at 10. Each aperture may be closed by a sliding valve member 11 supported in guide flanges 12 and each provided with an adjusting finger 13 so that the valve members 11 may be moved back and forth to open or close or change the effective area of the ports 10.

Some of the vertical flues are open only as at 15 to the frozen food chamber adjacent the bottom thereof. Other of the flues are open only as at 16 to the fresh food chamber above the floor defined by the removable planks 9.

When my shipper container is to be used, the planks 9 will be removed, the space below the flange will be filled with a plurality of frozen food packages 18 which may be pre-frozen or not as the case may be. When that area is filled, the planks 9 will be put in place to provide a floor and to separate the frozen food chamber below from the fresh food chamber above. Fresh food may be packed above the floor on pallets, if desired, or may be hung from the roof of the cage 5 by any suitable means, not here illustrated.

After the two chambers are loaded and the container is closed, liquid nitrogen or some other suitable cold boiling, non-deleterious liquid will be discharged into the frozen food chamber just below the floor 9 through ducts 19 and distributed through foraminous distribution conduit 20 at approximately atmospheric pressure, thus freezing the food and its water of composition down to a desired temperature below zero degrees F. Thus the water of composition of the frozen food no matter how it is packed serves as a permanent source of cold.

As the nitrogen evaporates, it passes up through the ports 10 as a cold gas and out through the perforations 6 as well as up through the flues for discharge through vents 21. The rate of gas movement will, of course, depend upon the rate at which the liquid is supplied to and boiled off by the food in the frozen food compartment. Once the desired amount of liquid nitrogen has been supplied, sufficient to cool the frozen food down to a desired temperature, the supply of liquid nitrogen will be cut off. The ducts 19 will be closed. At the start, the rate of flow of gas from the frozen food chamber to, through and from the fresh food chamber will depend on the rate at which the nitrogen is supplied but when the nitrogen is all evaporated, the container will remain filled with gaseous nitrogen at substantially atmospheric pressure.

During shipment the outside walls of the vertical flues will be warmed by heat flowing in through the insulation and the gas will tend to rise upwardly through the flues into the plenum chamber and return, being warmed enroute by the relatively farm, fresh meat, back through the ports 10 to the frozen food chamber.

It is important that the rate of flow be insufficient to freeze the fresh meat and so the ports 10 are controlled by adjusting the valves 11 in advance, based on expected conditions so as to limit the rate of gas flow from the below zero frozen meat chamber to the above freezing fresh food chamber so that the fresh food will be chilled but not frozen.

The flues with their upward traveling columns of gas form an additional heat barrier to inhibit entrance of heat into the fresh food chamber.

This up and down flow of gas is also promoted by the ports 16 so that concentration of cold gas at the bottom of the fresh meat chamber will be inhibited and danger of freezing the lower portions of the fresh food is avoided or at least is inhibited.

In order to prevent ingress of air, check valves 22 may be added to the ducts 21. Under ordinary circumstances, there will be a slight expansion as the average temperature of the entire box contents rises and some of the gas may escape but the check valve 22 prevents entrance of air if temporarily the pressure outside exceeds that inside the chamber.

The temperature desired for delivery of the food is a variable depending upon the desire of the customer. Perhaps on the average, fresh food should be delivered at 35 degrees F. Certainly frozen food should be delivered at below zero degrees F. The more liquid nitrogen that is poured in the lower the temperature of the frozen food. The longer the material is to remain in storage and transit, the lower the temperature desired. Since the insulation characteristic of the container is known and since the conditions of storage and shipment may be predicted, it is a simple enough matter to determine just what temperature is desired as the minimum in order to arrive at destination with the desired temperature. The point is that no matter what that temperature is, the rate of heat flow or heat exchange between the two chambers is by thermo-syphon effect and the cold air or cold gas is forced upwardly by thermo-syphon effect from below where the cold is to above where the relatively warm food is.

I claim:

1. In a shipper container having insulated top, bottom and side walls, a cage therein inwardly spaced from the top and side walls, a horizontal partition dividing the cage into a frozen food storage chamber below and a fresh food storage chamber above, the top of the cage being perforated, the perforations communicating with a plenum chamber defined between the top of the cage and the top wall of the container, vertical walls defining flues in the space between the cage and the vertical walls of the container, some of the flues being open at their bottom to the frozen food chamber, other of the flues open at their bottom to the fresh food chamber, all the flues open at their top for communication with the plenum chamber.

2. In a shipper container having insulated top, bottom and side walls, a cage therein inwardly spaced from the top and side walls, a horizontal partion dividing the cage into a frozen food storage chamber below and a fresh food storage chamber above, the top of the cage being perforated, the perforations communicating with a plenum chamber defined between the top of the cage and the top wall of the container, vertical walls defining flues in the space between the cage and the vertical walls of the container, some of the flues being open at their bottom to the frozen food chamber, other of the flues open at their bottom to the fresh food chamber, all the flues open at their top for communication with the plenum chamber, the floor dividing the frozen food and fresh food chambers being perforate and means for adjusting the effective openings of said perforations.

3. A shipper container including an insulated housing, a horizontal partition dividing it into a frozen food storage chamber below and a fresh food storage chamber above, a plenum chamber extending across the top of the fresh food storage chamber, a plurality of vertical flues extending around the outer periphery of the storage chamber in contact with the insulated walls thereof and extending vertically from the frozen food chamber at the bottom to the plenum chamber at the top, openings communicating the plenum chamber with the upper end portion of the fresh food storage chamber for the passage of air therethrough, said horizontal partition having openings extending therethrough for communication between the fresh food storage chamber and the frozen food chamber for the passage of air therethrough.

4. In a shipper container having insulated top, bottom and side walls, a cage therein inwardly spaced from the top and side walls, a horizontal partition dividing the cage into a frozen food storage chamber below and a fresh food storage chamber above, the top of the cage being perforated, the perforations communicating with a plenum chamber defined between the top of the cage and the top wall of the container, vertical walls defining flues in the space between the cage and the vertical walls of the container, some of the flues being open at their bottom to the frozen food chamber, other of the flues open at their bottom to the fresh food chamber, all the flues open at their top for communication with the plenum chamber, the wall of the cage interiorly horizontally flanged to support the horizontal partition, the horizontal partition being removable to permit access to the frozen food storage chamber.

References Cited in the file of this patent

UNITED STATES PATENTS

| | | |
|---|---|---|
| 1,900,855 | Aylesworth | Mar. 7, 1933 |
| 2,416,354 | Shoemaker | Feb. 25, 1947 |
| 2,613,836 | Newhall et al. | Oct. 14, 1952 |
| 2,620,079 | Rosenbaum | Dec. 2, 1952 |
| 2,901,891 | Morrison | Sept. 1, 1959 |
| 2,907,180 | Mann | Oct. 6, 1959 |
| 2,942,428 | Morrison | June 28, 1960 |
| 3,005,321 | Devery | Oct. 24, 1961 |
| 3,100,971 | Morrison | Aug. 20, 1963 |